(12) United States Patent
Oyama et al.

(10) Patent No.: US 9,094,121 B2
(45) Date of Patent: Jul. 28, 2015

(54) OPTICAL TRANSMISSION APPARATUS

(71) Applicant: FUJITSU LIMITED, Kawasaki-shi, Kanagawa (JP)

(72) Inventors: Tomofumi Oyama, Kawasaki (JP); Takeshi Hoshida, Kawasaki (JP); Hisao Nakashima, Kawasaki (JP)

(73) Assignee: FUJISTU LIMITED, Kawasaki (JP)

( * ) Notice: Subject to any disclaimer, the term of this patent is extended or adjusted under 35 U.S.C. 154(b) by 56 days.

(21) Appl. No.: 13/790,620

(22) Filed: Mar. 8, 2013

(65) Prior Publication Data
US 2013/0259480 A1    Oct. 3, 2013

(30) Foreign Application Priority Data

Mar. 29, 2012  (JP) ................................ 2012-078123
Jan. 22, 2013  (JP) ................................ 2013-009470

(51) Int. Cl.
H04J 14/06    (2006.01)
H04J 14/02    (2006.01)
H04B 10/2557  (2013.01)

(52) U.S. Cl.
CPC ............. *H04B 10/2557* (2013.01); *H04J 14/02* (2013.01)

(58) Field of Classification Search
CPC ... H04J 14/06; H04B 10/532; H04B 10/2569; H04B 10/2557
USPC ............................................. 398/65, 79, 43
See application file for complete search history.

(56) References Cited

U.S. PATENT DOCUMENTS

| | | | |
|---|---|---|---|
| 6,124,960 A  * | 9/2000 | Garthe et al. ................. | 398/194 |
| 7,343,101 B1  | 3/2008 | Frankel et al. | |
| 2002/0003641 A1* | 1/2002 | Hall et al. ...................... | 359/122 |
| 2003/0090768 A1* | 5/2003 | Liu et al. ....................... | 359/183 |
| 2006/0062577 A1* | 3/2006 | Miura et al. ................... | 398/82 |

(Continued)

FOREIGN PATENT DOCUMENTS

| | | |
|---|---|---|
| EP | 0 901 244 A2 | 3/1999 |
| EP | 1 903 706 A2 | 3/2008 |
| JP | 11-149064 | 6/1999 |

OTHER PUBLICATIONS

Extended European Search Report issued Jul. 16, 2013 in European Patent Application No. 13158534.1- 1860.

(Continued)

*Primary Examiner* — Oommen Jacob
(74) *Attorney, Agent, or Firm* — Staas & Halsey LLP

(57) ABSTRACT

An optical transmission apparatus includes transmitters configured to correspond to the polarization multiplexing optical signals, each of at least two of the transmitters including a first computing unit that computes, based on information regarding an optical transmission line including a plurality of spans and a polarization multiplexing optical signal, data waveform information regarding the transmitter and transmits the data waveform information to at least one another transmitter provided for at least one another polarization multiplexing optical signal, and a second computing unit that receives data waveform information from the at least one another transmitter provided for the at least one another polarization multiplexing optical signal and pre-equalizes or reduces cross phase modulation occurring in the optical transmission line of a transmission signal based on the data waveform information received from the at least one another transmitter provided for the at least one another polarization multiplexing optical signal.

5 Claims, 11 Drawing Sheets

(56) References Cited

U.S. PATENT DOCUMENTS

| | | | |
|---|---|---|---|
| 2006/0291867 A1* | 12/2006 | Tamura et al. | 398/152 |
| 2008/0075463 A1* | 3/2008 | Nakamoto | 398/79 |
| 2008/0089700 A1* | 4/2008 | Takahashi | 398/208 |
| 2009/0028552 A1* | 1/2009 | Zhang et al. | 398/25 |
| 2009/0162059 A1* | 6/2009 | Nakamoto | 398/48 |
| 2009/0214221 A1* | 8/2009 | Li et al. | 398/136 |
| 2010/0322627 A1* | 12/2010 | Desbruslais et al. | 398/65 |

OTHER PUBLICATIONS

Zhenning Tao et al., "Simple Fiber Model for Determination of XPM Effects", Journal of Lightwave Technology, vol. 29, No. 7, Apr. 1, 2011, pp. 974-986.

* cited by examiner

OPTICAL TRANSMISSION APPARATUS

CROSS-REFERENCE TO RELATED APPLICATIONS

This application is based upon and claims the benefit of priority of the prior Japanese Patent Application No. 2012-078123, filed on Mar. 29, 2012, and the Japanese Patent Application No. 2013-009470, filed on Jan. 22, 2013, the entire contents of which are incorporated herein by references.

FIELD

The embodiment discussed herein is related to an optical transmission apparatus.

BACKGROUND

With increasing communication traffic in a backbone network system, a demand for an optical communication system that can transmit signals over long distances and that can transmit a large amount of data increases. In order to increase an amount of data transmitted, the optical communication system generally employs a digital coherent transmission scheme in which a transmitter and a receiver compensate for signal degradation occurring in a transmission line using digital signal processing.

In wavelength division multiplex (WDM) optical communication performed in optical communication systems, a problem of degradation of an optical signal caused by a non-linear optical effect in an optical transmission line (an optical fiber) arises. In a long-distance WDM optical communication, one of reasons for signal degradation is cross phase modulation (XPM), which is one of non-linear optical effects. In particular, in a so-called super channel, which is a scheme in which a channel includes a plurality of sub-carriers, a distance between the wavelengths of adjacent carriers is small. Accordingly, the degradation caused by XPM is significant.

A known compensation scheme for XPM occurring in a transmission line over a plurality of spans has yet not been developed in the pre-equalization technology.

Refer to, for example, Japanese Laid-open Patent Publication No. 11-149064 and Zhenning Tao, et al. "Simple Fiber Model for Determination of XPM Effects", *Journal of Lightwave Technology*, vol. 29, No. 7, Apr. 1, 2011.

In some applications of an optical communication system, a plurality of repeaters is disposed in the optical transmission line extending between a transmitting apparatus and a receiving apparatus. Part of the optical transmission line located between two adjacent repeaters is referred to as a "span".

To reduce signal degradation caused by XPM, the pre-equalization technology has been developed. In the pre-equalization technology, a phase change that is opposite to the phase change caused by XPM occurring in a transmission line is given to a signal on the transmitter side in advance. As an existing technology for the wavelength division multiplexing optical communication, a technology that pre-equalizes XPM occurring in a first span has been developed. However, this technology does not take into account pre-equalization of XPM occurring in the second and subsequent spans. Accordingly, the demand for pre-equalization of XPM occurring in the second and subsequent spans is increasing. In order to pre-equalize XPM, it is desirable that the data waveform information regarding signals of all of the channels be shared by transmitters for all of the channels (i.e., for all of the wavelengths). However, if the data waveform information regarding signals of all of the channels is shared, the data capacity increases and, therefore, it is not practical. In addition, in polarization and wavelength division multiplexing optical communication, it is desirable that signal degradation caused by polarization crosstalk be taken into account.

SUMMARY

According to an aspect of the embodiments, an optical transmission apparatus for transmitting a wavelength division multiplexing optical signal having polarization multiplexing optical signals, the optical transmission apparatus comprising: optical transmitters configured to correspond to the polarization multiplexing optical signals, each of at least two of the optical transmitters including a first computing unit configured to compute, based on information regarding an optical transmission line including a plurality of spans and a polarization multiplexing optical signal, data waveform information regarding the optical transmitter and to transmit the data waveform information to at least one another optical transmitter provided for at least one another polarization multiplexing optical signal, and a second computing unit configured to receive data waveform information from the at least one another optical transmitter provided for the at least one another polarization multiplexing optical signal and to pre-equalizes or reduces cross phase modulation occurring in the optical transmission line of a transmission signal based on the data waveform information received from the at least one another optical transmitter provided for the at least one another polarization multiplexing optical signal The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present disclosure is described below with reference to the accompanying drawings. Note that the configurations of the embodiment are only illustrative. The configuration of the present disclosure is not limited thereto. Any other configurations appropriate for the disclosure may be employed in accordance with embodiments.

Figure 1:
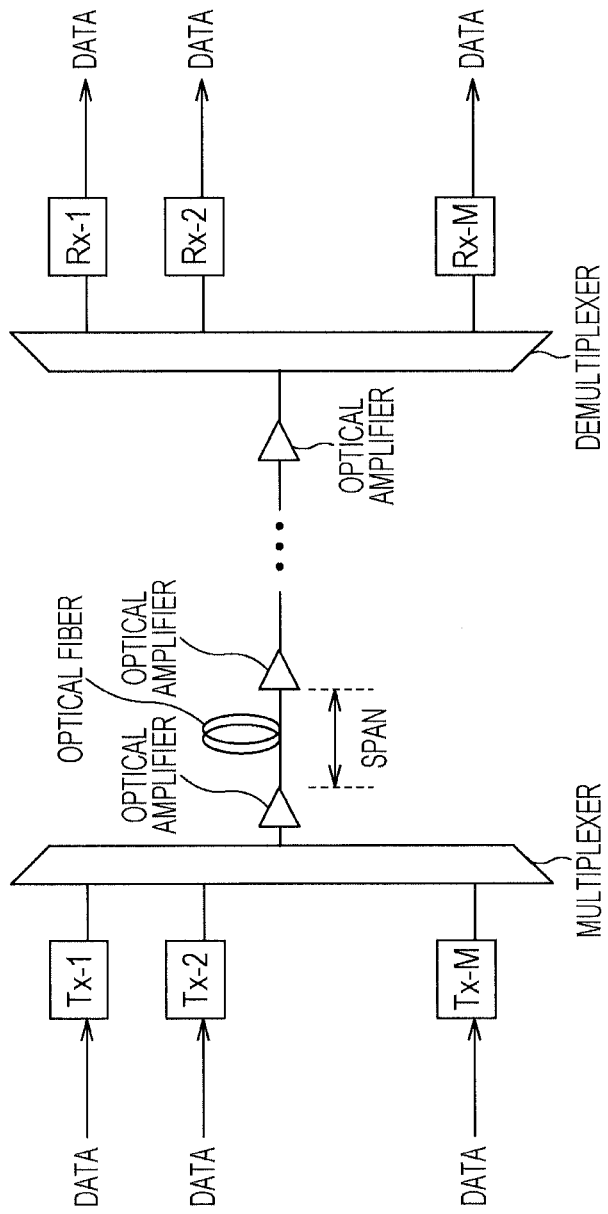
FIG. 1 illustrates an example of a system according to an embodiment.

FIG. 1 illustrates an example of a system according to the present exemplary embodiment. As illustrated in FIG. 1, the system includes a plurality of transmitters Tx-1 to Tx-M, a multiplexer, a plurality of optical amplifiers, an optical transmission line (an optical fiber), a demultiplexer, and a plurality of receivers Rx-1 to Rx-M. Part of the optical transmission line between two optical amplifiers is called a "span". One of the transmitters and one of the receivers are assigned to each of channels. Let "M" denote the number of channels. Herein, the transmitter and the receiver are an optical transmitter and an optical signal receiver, respectively.

Each of the transmitters receives data (data to be transmitted). Each of the transmitters pre-equalizes or reduces XPM of the transmission signal for the optical transmission line and changes the transmission signal into an analog format. Thereafter, the transmitter outputs the analog signal. The analog signals output from the transmitters are synthesized (multiplexed) by the multiplexer. A multiplexed optical signal (a polarization and wavelength division multiplexing optical signal) output from the multiplexer propagates in the optical transmission line including the plurality of optical amplifiers and is input to the demultiplexer on the receiver side. Note that at least one of the wavelengths of the wavelength-division multiplexing optical signals can include polarization multiplexing signal. All of the wavelengths do not necessarily have to include any polarization multiplexing signal. The demultiplexer distributes the input signals to all of the receivers for the corresponding channels. Each of the receivers converts the received signal into a digital format and extracts data. The transmitters are connected to one another so as to be communicable with one another.

Figure 2:
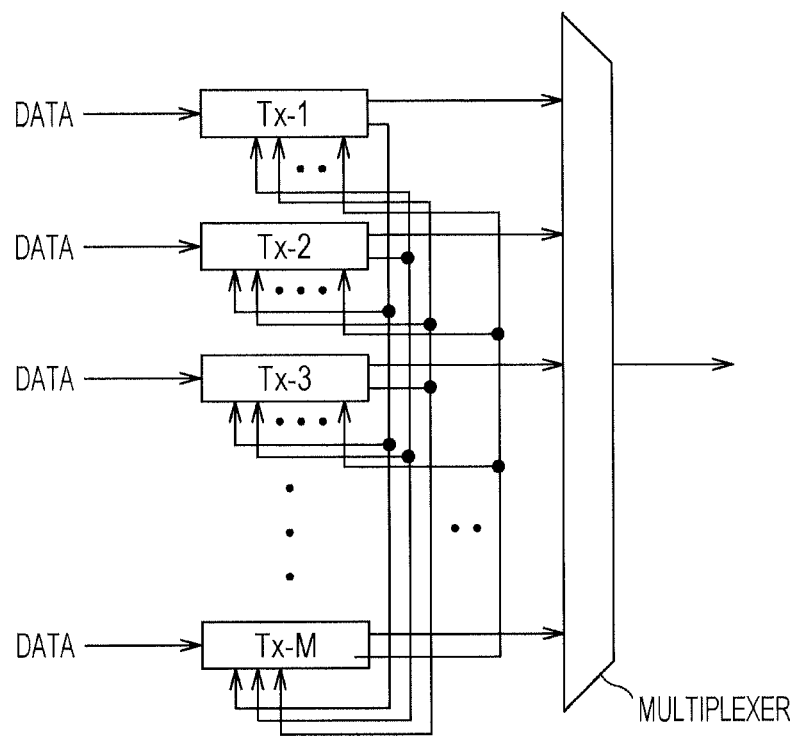
FIG. 2 illustrates an example of a plurality of transmitters in the system according to the embodiment.

FIG. 2 illustrates the plurality of transmitters in the system according to the present exemplary embodiment. Each of the transmitters Tx-1 to Tx-M receives data to be transmitted. The transmitter pre-equalizes or reduces XPM and outputs the transmission signal to the multiplexer. In addition, the transmitter outputs, to the other transmitters, data waveform information that is down-sampled. Each of transmitters pre-equalizes or reduces XPM in the optical transmission line for the transmission signal (data to be transmitted). The data items input to the transmitters differ from one another. The transmission signal is communicated at a bit rate of, for example, 100 Gbps.

According to the Jones matrix in polarization and wavelength-division multiplexing communication, XPM can be expressed as follows:

$$W(t) = e^{j\phi(t)} \begin{bmatrix} \sqrt{1-|w_{xy}(t)|^2}\, e^{j\Delta\phi(t)/2} & w_{yx}(t) \\ w_{xy}(t) & \sqrt{1-|w_{yx}(t)|^2}\, e^{-j\Delta\phi(t)/2} \end{bmatrix}$$

That is, in a receiver, the transmission signal is degraded by XPM as indicated by the matrix.

This matrix represents an effect of XPM on a transmission signal $(u_x, u_y)^T$ in an optical transmission line. The direction of the electric field of $u_x$ is perpendicular to the direction of $u_y$. The transmission signal $(u_x, u_y)^T$ is transmitted from the transmitter in the form of a polarization multiplexing signal. The elements of the matrix include $w_{xy/yx}$ that represents polarization crosstalk and $\phi$ and $\Delta\phi$ that represent phase noise caused by XPM. The phase noise is expressed as follows: $\phi=(\phi_x+\phi_y)/2$, and $\Delta\phi=\phi_x-\phi_y$. If the transmission signal is multiplied by the inverse matrix of the matrix W(t) in advance, the receiver can obtain a desired signal (the transmission signal). In this example, the optical transmission line has a 1st span to N-th span between an apparatus on the transmission side to an apparatus on the receiver side. An optical amplifier is disposed at an end of each span adjacent to the transmitter. In addition, the number of channels in the optical transmission line from the apparatus on the transmission side to the apparatus on the receiver side is M.

$w_{xy/yx}$ and $\phi_{x/y}$ are used in W(t) for the 1st channel. $w_{xy/yx}$ and $\phi_{x/y}$ can be expressed as follows (note that in each of the following equations for the k-th channel, $\Sigma$ for m represents the sum for m=1 to M (other than k)):

$$w_{yx/xy} = \sum_{m=2}^{M}\sum_{n=1}^{N} j u_{m,n,x/y}(0, t-\tau_{m,n}) u^*_{m,n,y/x}(0, t-\tau_{m,n}) \otimes h_{m,n}(t)$$

$$= \sum_{m=2}^{M}\sum_{n=1}^{N} p_{m,n,xy/yx} \otimes h_{m,n}(t)$$

$$(p_{m,n,yx/xy} = j u_{m,n,x/y}(0, t-\tau_{m,n}) u^*_{m,n,y/x}(0, t-\tau_{m,n}))$$

$$\phi_{x/y} = \sum_{m=2}^{M}\sum_{n=1}^{N} (2|u_{m,n,x/y}(0, t-\tau_{m,n})|^2 + |u^*_{m,n,y/x}(0, t-\tau_{m,n})|^2) \otimes h_{m,n}(t)$$

$$= \sum_{m=2}^{M}\sum_{n=1}^{N} q_{m,n,x/y} \otimes h_{m,n}(t)$$

$$(q_{m,n,x/y} = 2|u_{m,n,x/y}(0, t-\tau_{m,n})|^2 + |u^*_{m,n,y/x}(0, t-\tau_{m,n})|^2)$$

where N represents the number of spans up to the receiver, n represents a span number, M represents the total number of channels, m represents a channel number, and $u_{m,n,x/y}$ represents an x/y component of the electric field of the m-th channel of the n-th span. In addition, each of the x direction and the y direction is perpendicular to the light propagation direction, and the x direction is perpendicular to the y direction. $u_{m,n,x/y}$ is a function of a distance z and a time t. The distance z is a distance from the starting point (the origin) of each of the spans. $\tau_{m,n}$ represents the time difference between the target channel (the channel of interest) and the m-th channel of the n-th span. u* represents the complex conjugation of u.

Each of the transmitters may obtain W(t) by acquiring the data waveform information from the other transmitters. The transmitter may pre-equalize or reduces XPM for the optical transmission line by multiplying the data $(u_x, u_y)^T$ to be transmitted by the inverse matrix of W(t). For example, the data waveform information generated in the transmitter for the k-th channel can be expressed as follows:

$$w_{k,yx/xy} = \sum_{n=1}^{N} p_{k,n,xy/yx} \otimes h_{k,n}(t)$$

$$(p_{k,n,yx/xy} = j u_{k,n,x/y}(0, t-\tau_{k,n}) u^*_{k,n,y/x}(0, t-\tau_{k,n}))$$

$$\phi_{k,x/y} = \sum_{n=1}^{N} q_{k,n,x/y} \otimes h_{k,n}(t)$$

$$(q_{k,n,x/y} = 2|u_{k,n,x/y}(0, t-\tau_{k,n})|^2 + |u^*_{k,n,y/x}(0, t-\tau_{k,n})|^2)$$

where a frequency transfer function $H_{m,n}(\omega)$ can be expressed as follows:

$$H_{m,n}(\omega) = \frac{8\gamma_n}{9} \frac{1 - \exp(-\alpha_n L_n + j\Delta\beta'_{m,n}\omega L_n)}{-\alpha_n + j\Delta\beta'_{m,n}\omega} = FT(h_{m,n}(t))$$

In the above-described equation, $\Delta\beta'_{m,n}$ is a difference in group velocity between the target channel (the channel of interest) and the m-th channel of the n-th span. $L_n$ represents the length of the n-th span. $\alpha_n$ represents the attenuation coefficient of the n-th span. $\gamma_n$ represents the non-linear parameter of the n-th span. These values for each of the spans are prestored in the transmitter. The frequency transfer function $H_{m,n}(\omega)$ is referred to as an "XPM filter". The frequency transfer function $H_{m,n}(\omega)$ acts as a low-pass filter for the cut-off frequency $\alpha_n/\Delta\beta'_{m,n}$. That is, according to the frequency transfer function, a high-frequency component of the optical signal modulated using data is cut off in each of the spans. That is, the data waveform information having an effect on XPM is mainly included in a low-frequency component of the signal.

Figure 3:
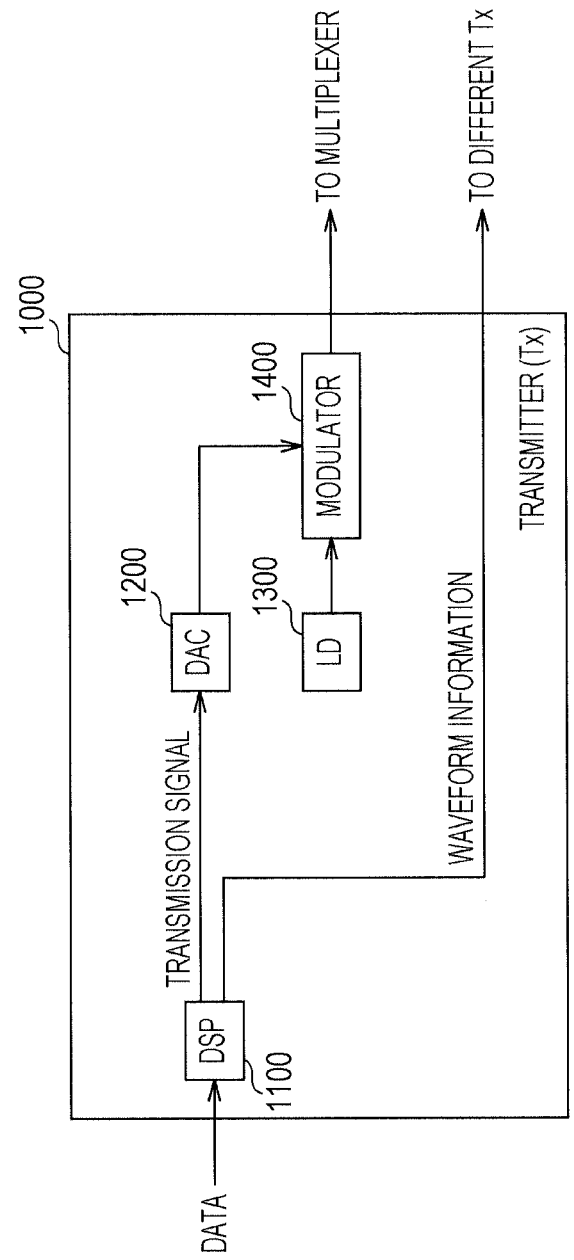
FIG. 3 illustrates an example of one of the transmitters (Tx) according to the embodiment.

FIG. 3 illustrates an example of one of the transmitters (Tx) according to the present exemplary embodiment. In the system according to the present exemplary embodiment, a transmitter is provided for each of the channels. All of the transmitters may have the same configuration. In this example, the transmitters are collectively referred to as a "transmitter 1000" if not specifically distinguished.

A transmitter 1000 includes a digital signal processor (DSP) 1100, a digital to analog converter (DAC) 1200, a laser diode (LD) 1300, and an optical modulator 1400.

The DSP 1100 applies distortion compensation to a digital signal $(U_x, U_y)$ and outputs the digital signal as a transmission signal. In addition, the DSP 1100 computes the data waveform information and outputs the data waveform information to the other transmitters. The DSP 1100 computes a distortion compensation matrix on the basis of, for example, the data waveform information received from the other transmitters and information regarding the optical transmission line. An example of the DSP 1100 is described in more detail below. A field programmable gate array (FPGA) and/or an application specific integrated circuit (ASIC) may be used instead of the DSP. Alternatively, any combination of a DSP, a FPGA, and/or an ASIC may be used.

The DAC 1200 converts the transmission signal (in a digital format) input from the DSP 1100 into an analog format.

The LD 1300 is a laser light source. The LD 1300 generates continuous wave (CW) light. The LD 1300 outputs the generated laser light to the modulator 1400. For example, a laser diode is used as the LD 1300.

The modulator 1400 modulates the laser light input from the LD 1300 using the transmission signal input from the DAC 1200. The optical signal output from the modulator 1400 is delivered to the multiplexer.

Examples of the DSP 1100 included in the transmitter 1000 are described below. Any one of a DSP 100, a DSP 200, and a DSP 300 described below may be used as the DSP 1100 included in the transmitter 1000. The DSP 100, the DSP 200, and the DSP 300 may be combined in any way possible.

Figure 4:
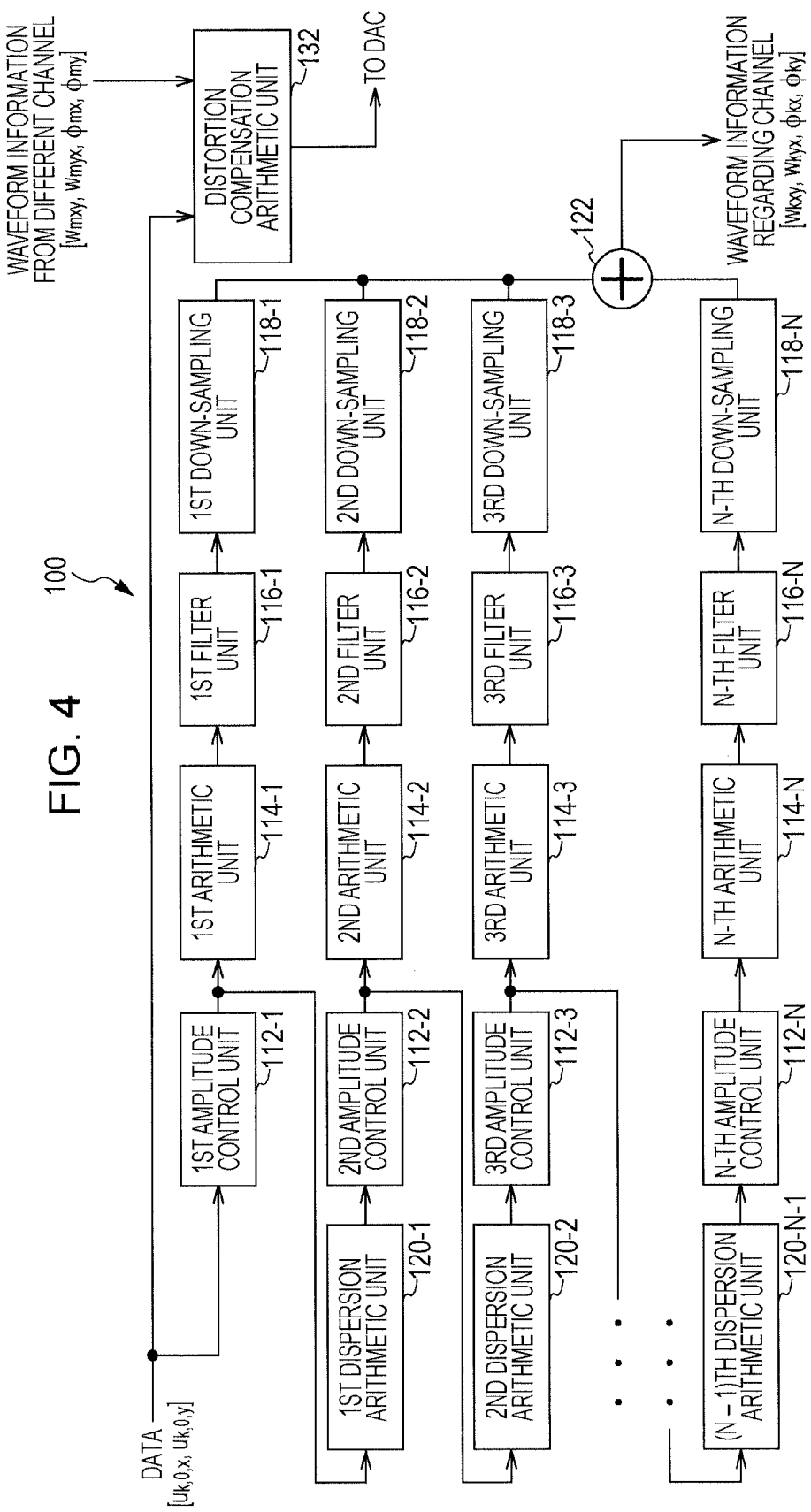
FIG. 4 illustrates a first functional configuration for executing a program using a DSP included in the transmitter.

FIG. 4 illustrates a functional configuration for executing a program using the DSP included in the transmitter. The DSP 100 is illustrated in FIG. 4. The DSP 100 includes N amplitude control units 112, N arithmetic units 114, N filter units 116, N down-sampling units 118, (N−1) dispersion arithmetic units 120, an adder 122, and a distortion compensation arithmetic unit 132. In this example, the N amplitude control units 112 are formed from a 1st amplitude control unit 112-1 to an N-th amplitude control unit 112-N. The N arithmetic units 114 are formed from a 1st arithmetic unit 114-1 to an N-th arithmetic unit 114-N. The N filter units 116 are formed from a 1st filter unit 116-1 to an N-th filter unit 116-N. The N down-sampling units 118 are formed from a 1st down-sampling unit 118-1 to an N-th down-sampling unit 118-N. The (N−1) dispersion arithmetic units 120 are formed from a 1st dispersion arithmetic unit 120-1 to an (N−1)-th dispersion arithmetic unit 120-N−1. In this example, the DSP 100 is considered as a DSP of the transmitter for a k-th channel.

Each of the N amplitude control units 112 corresponds to one of the optical amplifiers disposed in a transmission line. The amplitude control unit 112 simulates amplification performed by the optical amplifier. If the optical transmission line has N spans, N optical amplifiers are disposed in the optical transmission line. When the optical amplifiers are named as a 1st optical amplifier, a 2nd optical amplifier, ..., an N-th optical amplifier from the transmitter side, an s-th amplitude control unit 112-s corresponds to the s-th optical amplifier (s is any integer in the range from 1 to N). The s-th amplitude control unit 112-s controls the amplitude of the input signal in accordance with the optical output power of the s-th optical amplifier. The transmitter 1000 obtains the setting value of the optical output power of each of the optical amplifiers in advance. For example, the 1st amplitude control unit 112-1 controls the amplitude of the data $(u_x, u_y)^T$ to be transmitted in accordance with the optical output of the 1st optical amplifier. Thus, a signal output from the s-th amplitude control unit 112-s of the transmitter is $(u_{k,s,x}, u_{k,s,y})^T$.

Figure 7:
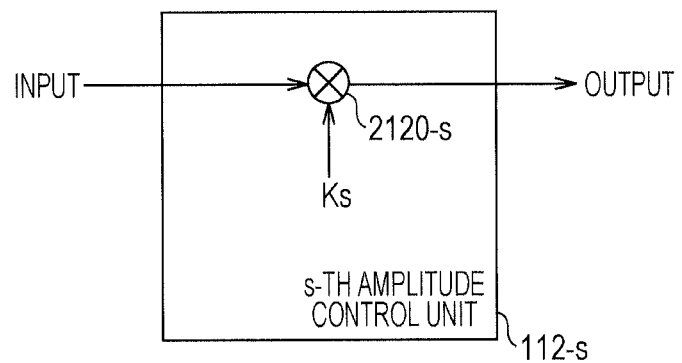
FIG. 7 illustrates an example of an s-th amplitude control unit.

FIG. 7 illustrates an example of the s-th amplitude control unit. As illustrated in FIG. 7, the s-th amplitude control unit 112-s includes a multiplier 2120-s. Data $(u_{k,0,x}, u_{k,0,y})^T$ to be transmitted is input to a multiplier 2120-1. In addition, an amplitude control coefficient $K_1$ is input to the multiplier 2120-1. The multiplier 2120-1 multiplies the data $(u_{k,0,x}, u_{k,0,y})^T$ to be transmitted by the amplitude control coefficient $K_1$ and outputs the resultant value to the 1st arithmetic unit 114-1. The multiplier 2120-s (s>1) receives the output of the (s−1) dispersion arithmetic unit 120-s−1 and an amplitude control coefficient K. The multiplier 2120-s multiplies the output of the (s−1) dispersion arithmetic unit 120-s−1 by the amplitude control coefficient $K_s$ and outputs the resultant value to the s-th arithmetic unit 114-s.

The arithmetic unit 114 computes the above-described $p_{k,n,yx/xy}$ and $q_{k,n,x/y}$. The arithmetic unit 114 computes $p_{k,n,yx/xy}$ and $q_{k,n,x/y}$ on the basis of a signal output from the amplitude control unit 112.

Figure 8:
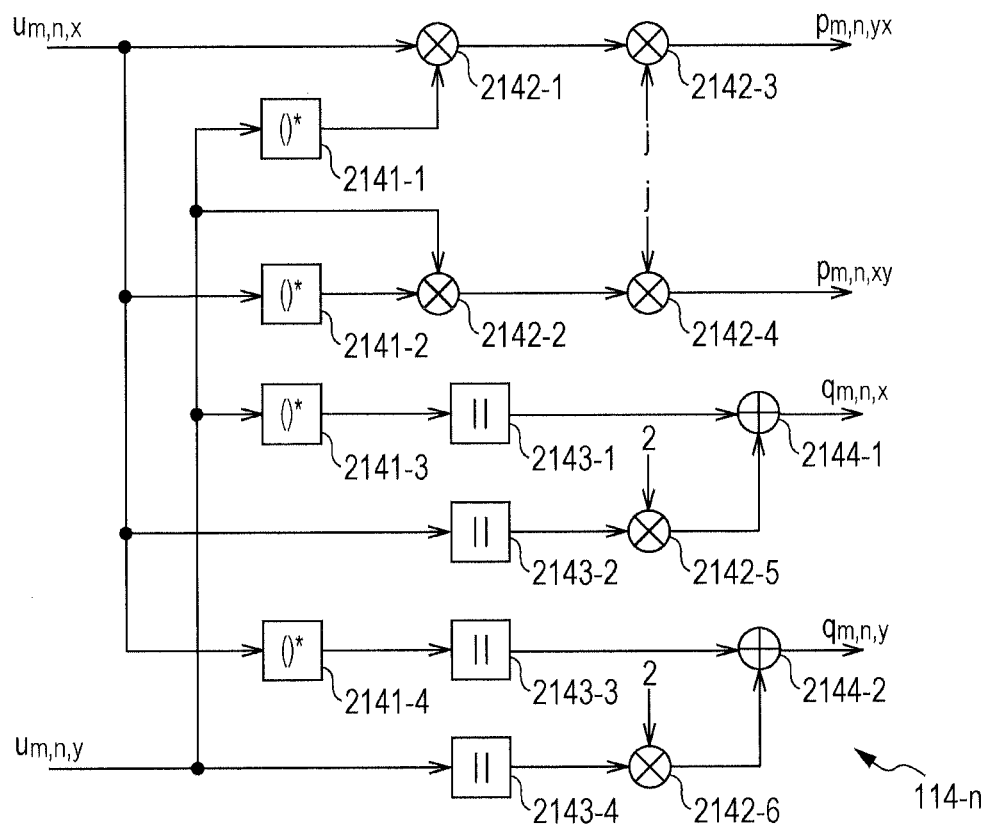
FIG. 8 illustrates an example of an n-th arithmetic unit.

FIG. 8 illustrates an example of the n-th arithmetic unit. In this example, a signal is input to the n-th arithmetic unit 114-n in the m-th channel. As illustrated in FIG. 8, the n-th arithmetic unit 114-n includes conjugate arithmetic units 2141-1 to 2141-4, multipliers 2142-1 to 2142-6, absolute value arithmetic units 2143-1 to 2143-4, and adders 2144-1 and 2144-2. The n-th arithmetic unit 114-n receives a signal $u_{m,n,x/y}$ and outputs a signal $p_{m,n,yx/xy}$ and a signal $q_{m,n,x/y}$.

The operation performed by the n-th arithmetic unit 114-n is described in detail below. An input signal $u_{m,n,x}$ is input to the multiplier 2142-1, the conjugate arithmetic unit 2141-2, the absolute value arithmetic unit 2143-2, and the conjugate arithmetic unit 2141-4. An input signal $u_{m,n,y}$ is input to the conjugate arithmetic unit 2141-1, the multiplier 2142-2, the conjugate arithmetic unit 2141-3, and the absolute value arithmetic unit 2143-4. The conjugate arithmetic unit 2141-1 computes the complex conjugate of the input signal $u_{m,n,y}$ and outputs the complex conjugate to the multiplier 2142-1.

The conjugate arithmetic unit 2141-2 computes the complex conjugate of the input signal $u_{m, n, x}$ and outputs the complex conjugate to the multiplier 2142-2. The conjugate arithmetic unit 2141-3 computes the complex conjugate of the input signal $u_{m, n, y}$ and outputs the complex conjugate to the absolute value arithmetic unit 2143-1. The conjugate arithmetic unit 2141-4 computes the complex conjugate of the input signal $u_{m, n, x}$ and outputs the complex conjugate to the absolute value arithmetic unit 2143-2. The multiplier 2142-1 multiplies the input signal $u_{m, n, x}$ by the output of the conjugate arithmetic unit 2141-1 and outputs the resultant value to the multiplier 2142-3. The multiplier 2142-2 multiplies the input signal $u_{m, n, y}$ by the output of the conjugate arithmetic unit 2141-2 and outputs the resultant value to the multiplier 2142-4. The absolute value arithmetic unit 2143-1 computes the absolute value of the output of the conjugate arithmetic unit 2141-3 and outputs the resultant value to the adder 2144-1. The absolute value arithmetic unit 2143-2 computes the absolute value of the input signal $u_{m, n, x}$ and outputs the resultant value to the multiplier 2142-5. The absolute value arithmetic unit 2143-3 computes the absolute value of the output of the conjugate arithmetic unit 2141-4 and outputs the resultant value to the adder 2144-2. The absolute value arithmetic unit 2143-4 computes the absolute value of the input signal $u_{m, n, y}$ and outputs the resultant value to the multiplier 2142-6. The multiplier 2142-3 multiplies the output of the multiplier 2142-1 by an imaginary unit j and outputs the resultant value as an output signal $p_{m, n, yx}$. The multiplier 2142-4 multiplies the output of the multiplier 2142-2 by the imaginary unit j and outputs the resultant value as an output signal $p_{m, n, xy}$. The multiplier 2142-5 multiplies the output of the absolute value arithmetic unit 2143-2 by "2" and outputs the resultant value to the adder 2144-1. The multiplier 2142-6 multiplies the output of the absolute value arithmetic unit 2143-4 by "2" and outputs the resultant value to the adder 2144-2. The adder 2144-1 sums the output of the absolute value arithmetic unit 2143-1 and the output of the multiplier 2142-5 and outputs the sum as an output signal $p_{m, n, x}$. The adder 2144-2 sums the output of the absolute value arithmetic unit 2143-3 and the output of the multiplier 2142-6 and outputs the sum as an output signal $p_{m, n, y}$.

Each of the filter units 116 computes the above-described $H_{k, n}(\omega)$ (or $h_{k, n}(t)$). In order to compute $H_{k, n}(\omega)$, the group velocity of the span, the attenuation coefficient of the span, the non-linear parameter of the span, and the length of the span are used, for example. These data are prestored in each of the transmitters. The filter unit 116 uses such stored data. In addition, the filter unit 116 multiplies the output of the arithmetic unit 114 by the frequency transfer function $H_{k, n}(\omega)$. This multiplication operation may be performed in the frequency space by using $H_{k, n}(\omega)$ or in the time space using $h_{k, n}(t)$.

The down-sampling units 118 down-sample the outputs of the filter units 116. Since a high-frequency component is cut off by the filter units 116, degradation of the quality of a signal caused by the down-sampling units 118 is small. The sampling rate can be determined so as to be higher than or equal to twice the cut-off frequency of the frequency transfer function.

Each of the dispersion arithmetic units 120 corresponds to one of the spans of the optical transmission line. The dispersion arithmetic unit 120 simulates the chromatic dispersion of the span of the optical transmission line. The dispersion arithmetic unit 120 applies a predetermined function to the output of the amplitude control unit 112.

A transfer function $H_{CD, n}(\omega)$ of the chromatic dispersion in an n-th span can be expressed as follows:

$$H_{CD,n}(\omega) = \exp\left(\frac{j\omega^2 d_{a,n}}{2}\right), \quad d_{a,n} = \int_0^{Ln} \beta_{2,n}(z)dz$$

where $d_{a, n}$ represents the accumulated dispersion of the n-th span, $\beta_{2, n}(z)$ represents the coefficient of the group velocity dispersion, which is the second order differential of a propagation coefficient $\beta_n$ with respect to a frequency. The dispersion parameter $\beta_{2, n}(z)$ can be expressed using a dispersion value $D_n$ as follows:

$$D_n = -\frac{c}{2\pi\lambda}\left(\frac{d^2\beta_n}{d\omega^2}\right) = -\frac{c}{2\pi\lambda}\beta_{2,n}$$

where c represents the velocity of light, and λ represents the wavelength of the signal light. Note that the dispersion value $D_n$ is a known value as a parameter of the transmission line.

For example, a signal $(u_{k, s, x}, u_{k, s, y})^T$ is input from the s-th amplitude control unit 112-s to the s-th dispersion arithmetic units 120-s. Thus, a simulation result of the signal that has passed through the s-th span can be obtained using the above-described transfer function.

Figure 9:
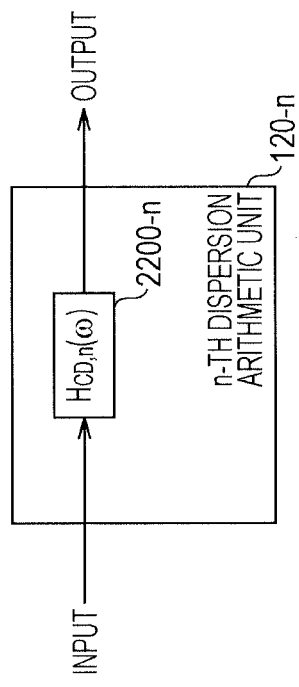
FIG. 9 illustrates an example of an n-th dispersion arithmetic unit.

FIG. 9 illustrates an example of the n-th dispersion arithmetic unit. As illustrated in FIG. 9, the n-th dispersion arithmetic unit 120-n includes an n-th dispersion arithmetic circuit 2200-n. The n-th dispersion arithmetic circuit 2200-n performs computation on the input signal using the transfer function $H_{CD, n}(\omega)$ and outputs the result of computation. If the dispersion parameter $\beta_2$ is the same for all of the spans, the transfer function $H_{CD, n}(\omega)$ can be expressed as follows:

$$H_{CD,n}(\omega) = \exp\left(\frac{-j\beta_2 Ln(\omega - \omega_0)^2}{2}\right)$$

where $\omega_0$ represents the center frequency of the signal, and Ln represents the length of the n-th span.

The adder 122 sums the outputs of the down-sampling units 118. The adder 122 outputs the sum to the other transmitters as the data waveform information regarding the k-th channel. The data waveform information regarding the k-th channel includes the above-described $w_{k, xy/yx}$ and $\phi_{k, x/y}$. The bit rate of communication for outputting the data waveform information to the other transmitters can be the same as the sampling rate of the down-sampling unit 118. The sampling rate of the down-sampling unit 118 is sufficiently lower than that of the transmission signal. A buffer circuit may be disposed between the adder 122 and the output of each of the down-sampling units 118.

The data waveform information items $w_{k, xy/yx}$ and $\phi_{k, x/y}$ regarding the k-th channel output from the adder 122 can be expressed using the outputs $p_{k, n, yx/xy}$ and $q_{k, n, x/y}$ of the down-sampling units 118 as follows:

$$w_{k,xy} = \sum_{n=1}^{N} p_{k,n,yx}$$

$$w_{k,yx} = \sum_{n=1}^{N} p_{k,n,xy}$$

-continued $$\phi_{k,xy} = \sum_{n=1}^{N} q_{k,n,x}$$

$$\phi_{k,yx} = \sum_{n=1}^{N} q_{k,n,y}$$

The data waveform information items $w_{k, xy/yx}$ and $\phi_{k, x/y}$ regarding the k-th channel are output to the distortion compensation arithmetic units for the other channels.

The distortion compensation arithmetic unit 132 computes the matrix W for the k-th channel on the basis of the data waveform information received from the transmitters for the other channels. The matrix W for the k-th channel indicates the effect of XPM in the transmission line on the signal of the k-th channel. The distortion compensation arithmetic unit 132 multiplies the data $(u_{k, 0, x}, u_{k, 0, y})^T$ to be transmitted by an inverse matrix $W^{-1}$ of the matrix W for the k-th channel. The distortion compensation arithmetic unit 132 outputs the result of computation to the DAC.

Figure 10:
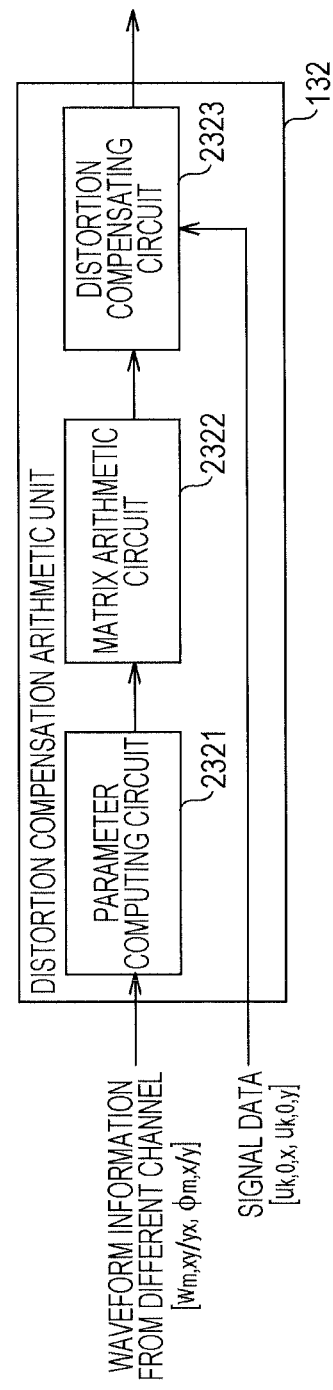
FIG. 10 illustrates an example of a distortion compensation arithmetic unit.

FIG. 10 illustrates an example of the distortion compensation arithmetic unit. As illustrated in FIG. 10, the distortion compensation arithmetic unit 132 includes a parameter computing circuit 2321, a matrix arithmetic circuit 2322, and a distortion compensating circuit 2323.

Figure 11:
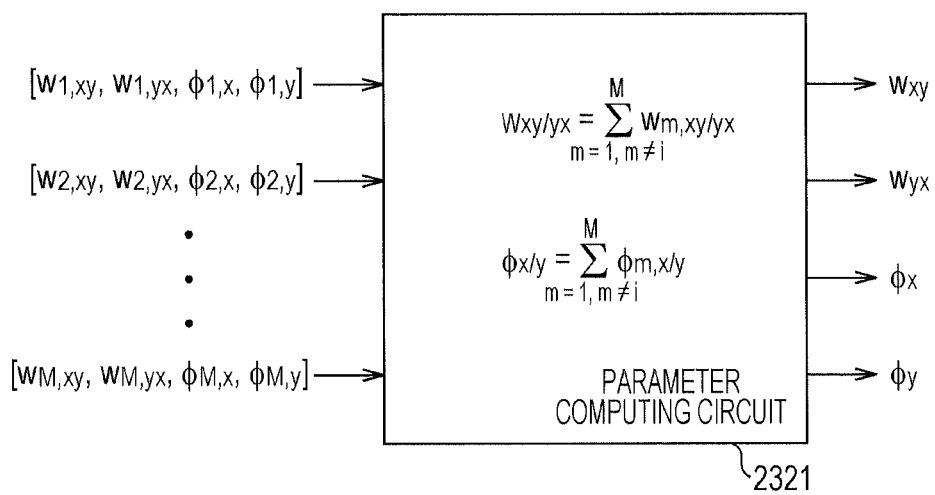
FIG. 11 illustrates an example of a parameter computing circuit.

FIG. 11 illustrates an example of the parameter computing circuit. The parameter computing circuit 2321 computes the sum of each of the data waveform information items $w_{m, xy}$, $w_{m, yx}$, $\phi_{m, x}$, and $\phi_{m, y}$ (m=1, M, other than k) input from the other channels (the channel of interest is a k-th channel) as follows:

$$w_{xy/yx} = \sum_{m=1, m \neq k}^{M} w_{m,xy/yx}$$

$$\phi_{x,y} = \sum_{m=1, m \neq k}^{M} \phi_{m,x/y}$$

The results of computation are output to the matrix arithmetic circuit 2322.

Figure 12:
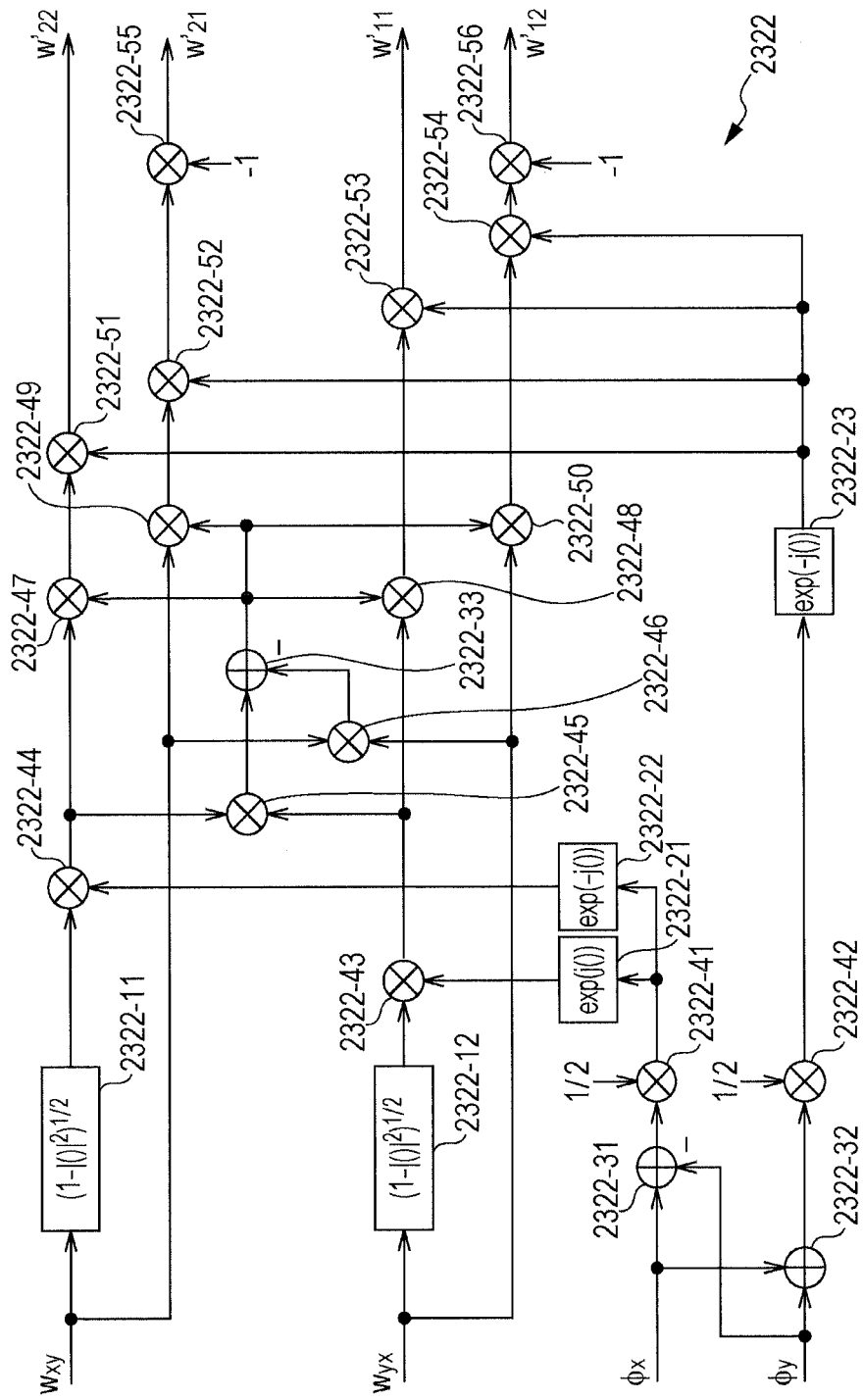
FIG. 12 illustrates an example of a matrix arithmetic circuit.

FIG. 12 illustrates an example of the matrix arithmetic circuit. As illustrated in FIG. 12, the matrix arithmetic circuit 2322 includes polarization crosstalk computing calculators 2322-11 and 2322-12, phase noise calculators 2322-21 and 2322-23, adders 2322-31 to 2322-33, and multipliers 2322-41 to 2322-56. The matrix arithmetic circuit 2322 receives $w_{xy/yx}$ and $\phi_{x/y}$ and outputs $w'_{11}$, $w'_{12}$, $w'_{21}$, and $w'_{22}$.

The operation performed by the matrix arithmetic circuit 2322 is described in detail below. An input signal $w_{xy}$ is input to the polarization crosstalk computing calculator 2322-11, the multiplier 2322-46, and the multiplier 2322-49. An input signal $w_{yx}$ is input to the polarization crosstalk computing calculator 2322-12, the multiplier 2322-46, and the multiplier 2322-50. An input signal $\phi_x$ is input to the adder 2322-31 and the adder 2322-32. An input signal $\phi_y$ is input to the adder 2322-31 and the adder 2322-32. The polarization crosstalk computing calculator 2322-11 computes $(1-|W_{xy}|^2)^{1/2}$ and outputs the computed value to the multiplier 2322-44. The polarization crosstalk computing calculator 2322-12 computes $(1-|W_{yx}|^2)^{1/2}$ and outputs the computed value to the multiplier 2322-43. The adder 2122-31 computes $(\phi_x-\phi_y)$ and outputs the computed value to the multiplier 2322-41. The multiplier 2322-41 multiplies the output of the adder 2122-31 by "½" and outputs the computed value to the phase noise calculator 2322-21 and the phase noise calculator 2322-22. The adder 2122-32 computes $(\phi_x+\phi_y)$ and outputs the computed value to the multiplier 2322-42. The multiplier 2322-42 multiplies the output of the adder 2122-32 by "½" and outputs the computed value to the phase noise calculator 2322-23. The phase noise calculator 2322-21 computes exp(jx) from an output x of the multiplier 2322-41 and outputs the computed value to the multiplier 2322-43. The phase noise calculator 2322-22 computes exp(-jx) from the output x of the multiplier 2322-41 and outputs the computed value to the multiplier 2322-44. The multiplier 2322-43 multiplies the output of the polarization crosstalk computing calculator 2322-12 by the output of the phase noise calculator 2322-21 and outputs the computed value to the multiplier 2322-45 and the multiplier 2322-48. The multiplier 2322-44 multiplies the output of the polarization crosstalk computing calculator 2322-11 by the output of the phase noise calculator 2322-22 and outputs the computed value to the multiplier 2322-45 and the multiplier 2322-47. The multiplier 2322-45 multiplies the output of the multiplier 2322-44 and the output of the multiplier 2322-43 and outputs the computed value to the adder 2322-33. The multiplier 2322-46 multiplies the input signal $w_{xy}$ by the input signal $w_{yx}$ and outputs the computed value to the adder 2322-33. The adder 2322-33 computes the difference between the output of the multiplier 2322-45 and the output of the multiplier 2322-46 and outputs the computed value to the multipliers 2322-47 to 2322-50. The multiplier 2322-47 multiplies the output of the multiplier 2322-44 by the output of the adder 2322-33 and outputs the computed value to the multiplier 2322-51. The multiplier 2322-48 multiplies the output of the multiplier 2322-43 by the output of the adder 2322-33 and outputs the computed value to the multiplier 2322-53. The multiplier 2322-49 multiplies the input signal $w_{xy}$ by the output of the adder 2322-33 and outputs the computed value to the multiplier 2322-52. The multiplier 2322-50 multiplies the input signal $w_{yx}$ by the output of the adder 2322-33 and outputs the computed value to the multiplier 2322-54. The phase noise calculator 2322-23 computes exp(-jx) from the output x of the multiplier 2322-42 and outputs the computed value to the multipliers 2322-51 to 2322-54. The multiplier 2322-51 multiplies the output of the multiplier 2322-47 by the output of the phase noise calculator 2322-23 and outputs the computed value as the output signal $w'_{22}$. The multiplier 2322-52 multiplies the output of the multiplier 2322-49 by the output of the phase noise calculator 2322-23 and outputs the computed value as the output signal $w'_{21}$. The multiplier 2322-53 multiplies the output of the multiplier 2322-48 by the output of the phase noise calculator 2322-23 and outputs the computed value as the output signal $w'_{11}$. The multiplier 2322-54 multiplies the output of the multiplier 2322-50 by the output of the phase noise calculator 2322-23 and outputs the computed value as the output signal $w'_{12}$.

The output of the matrix arithmetic circuit 2322 corresponds to the inverse matrix $w^{-1}$ of the matrix W according to the above-described Jones matrix model as follows:

$$W^{-1} = \begin{pmatrix} w'_{11} & w'_{12} \\ w'_{21} & w'_{22} \end{pmatrix}$$

Figure 13:
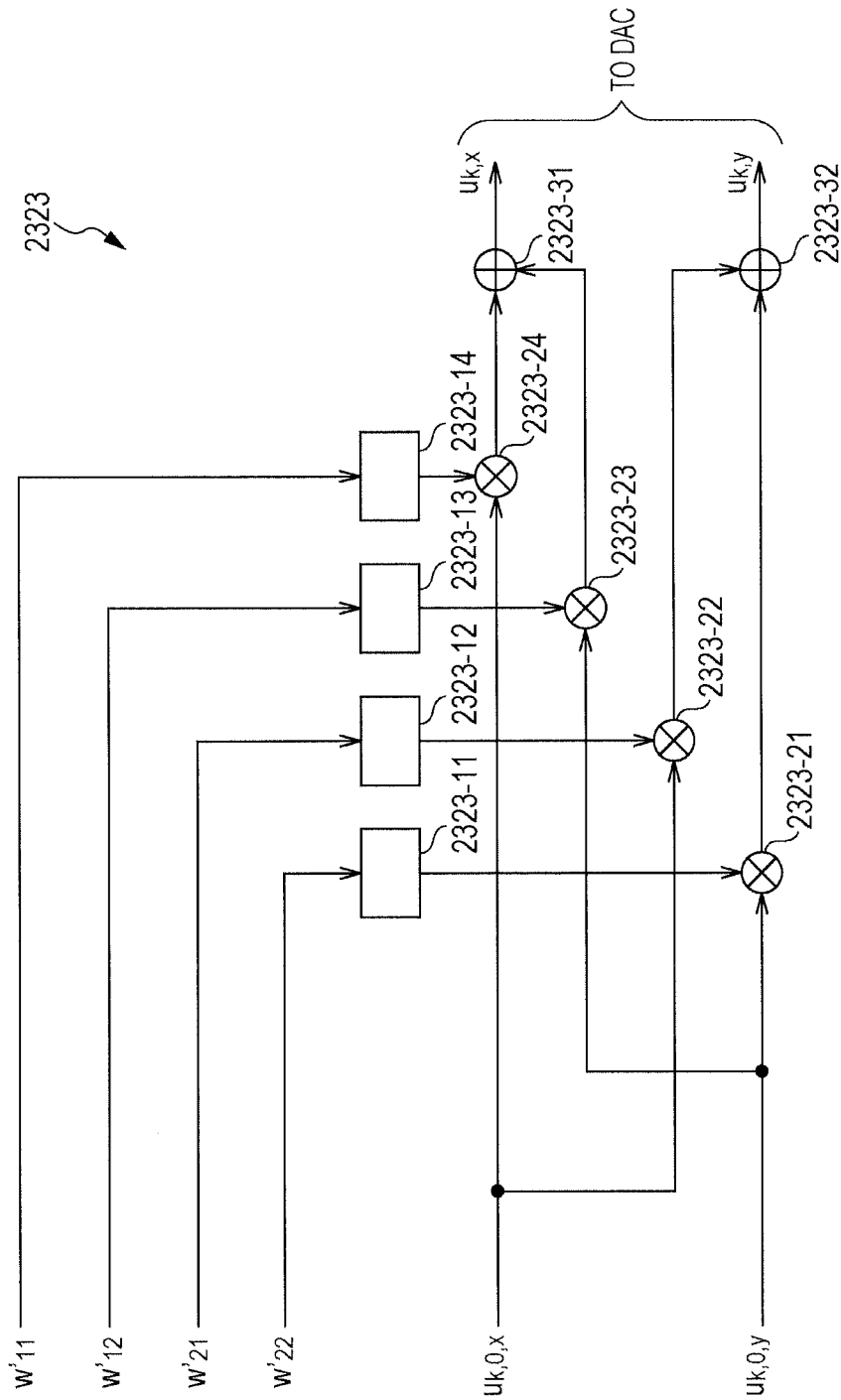
FIG. 13 illustrates an example of a distortion compensating circuit.

FIG. 13 illustrates an example of a distortion compensating circuit. The distortion compensating circuit 2323 includes up-sampling sections 2323-11 to 2323-14, multipliers 2323-21 to 2323-24, and adders 2323-31 and 2323-32. The distortion compensating circuit 2323 generates a signal output to the DAC from the output of the matrix arithmetic circuit 2322, a signal $u_{i,0,x}$, and a signal $u_{i,0,y}$. The distortion compensating circuit 2323 multiplies the inverse matrix $W^{-1}$ of the matrix W by the transmission signal and generates a signal used to pre-equalize or reduce XPM.

Each of the up-sampling sections 2323-11 to 2323-14 up-samples the output of the matrix arithmetic circuit 2322. Each of the up-sampling sections 2323-11 to 2323-14 makes the sample rate of the output of the matrix arithmetic circuit 2322 the same as the sample rate of the signal $u_{i,0,x}$ and signal $u_{i,0,y}$. The up-sampling section 2323-11 receives the signal $w'_{22}$. The up-sampling section 2323-12 receives the signal $w'_{21}$. The up-sampling section 2323-13 receives the signal $w'_{12}$. The up-sampling section 2323-14 receives the signal $w'_{11}$. The outputs of the up-sampling sections 2323-11 to 2323-14 are input to the multipliers 2323-21 to 2323-24, respectively. For example, a flip-flop circuit is used as each of the up-sampling sections 2323-11 to 2323-14.

The multiplier 2323-21 multiplies a signal $u_{k,0,y}$ by the output of the up-sampling section 2323-11 and outputs the computed value to the adder 2323-32. The multiplier 2323-22 multiplies a signal $u_{k,0,x}$ by the output of the up-sampling section 2323-12 and outputs the computed value to the adder 2323-32. The multiplier 2323-23 multiplies the signal $u_{k,0,y}$ by the output of the up-sampling section 2323-13 and outputs the computed value to the adder 2323-31. The multiplier 2323-24 multiplies the signal $u_{k,0,x}$ by the output of the up-sampling section 2323-14 and outputs the computed value to the adder 2323-31.

The adder 2323-31 sums the output of the multiplier 2323-23 and the output of the multiplier 2323-24 and outputs a signal $u_{k,x}$ to the DAC. The adder 2323-32 sums the output of the multiplier 2323-21 and the output of the multiplier 2323-22 and outputs a signal $u_{k,y}$ to the DAC. A digital signal $(u_{k,x}, u_{k,y})$ is a transmission signal for the k-th channel obtained after XPM is pre-equalized or reduced.

In order to control a delay of processing, a buffer circuit may be provided on the input side of the distortion compensation arithmetic unit 132. In addition, in order to compensate for factors other than XPM, a signal processing circuit and a filter may be provided on the input side or the output side of the distortion compensation arithmetic unit 132.

Since, in the DSP 100, the processing is performed by the dispersion arithmetic units 120 and the amplitude control unit 112 before data are input to the down-sampling units 118, degradation of a signal can be reduced. In addition, since a signal is down-sampled by the down-sampling unit 118, the data waveform information is transmitted to the other transmitters at a bit rate that is lower than that of the transmission signal.

The amplitude control unit 112, the arithmetic unit 114, the filter units 116, the down-sampling units 118, the dispersion arithmetic units 120, and the adder 122 together serve as a first computing unit. In contrast, the distortion compensation arithmetic unit 132 serves as a second computing unit.

Figure 5:
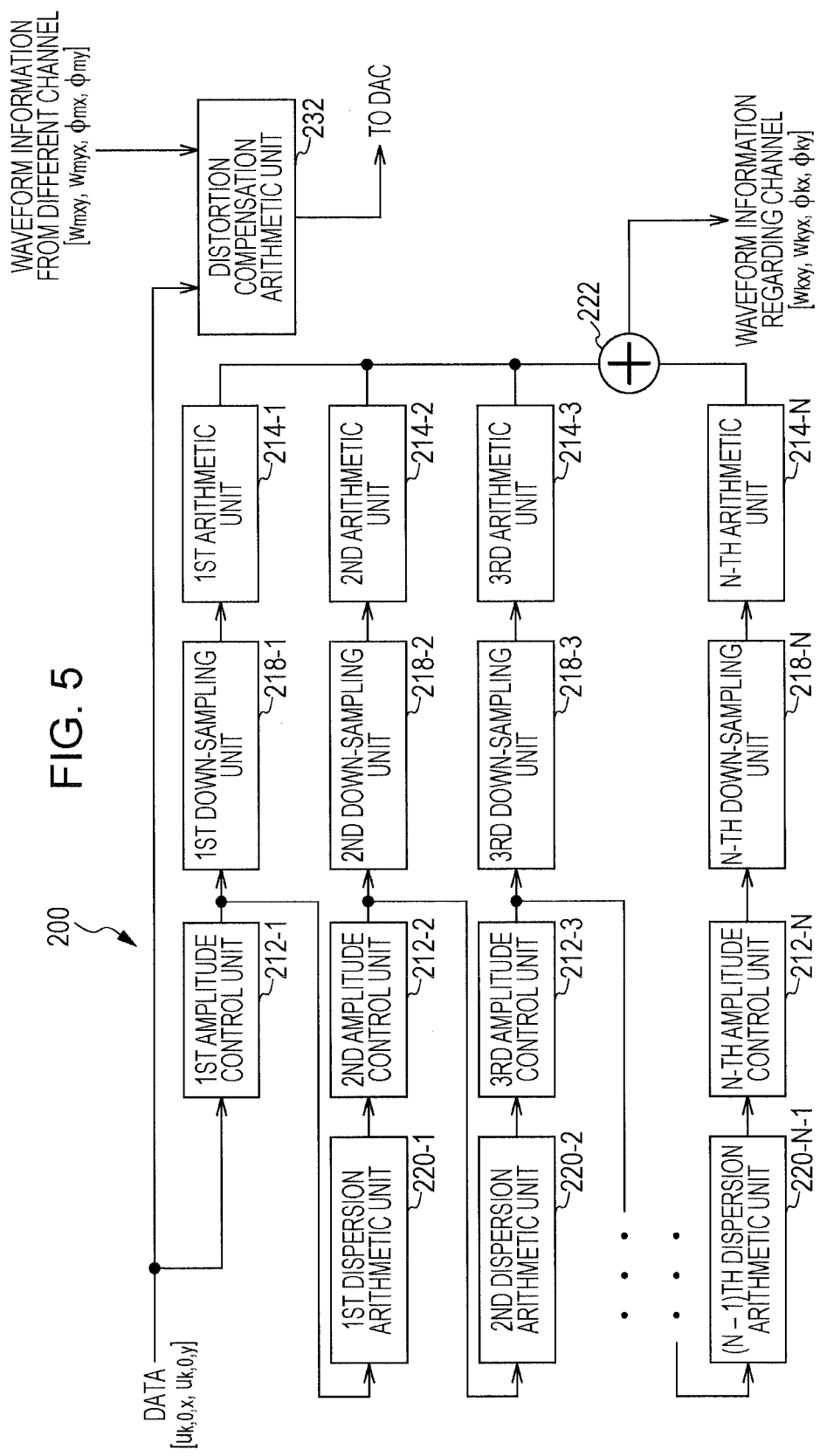
FIG. 5 illustrates a second functional configuration for executing a program using a DSP included in the transmitter.

FIG. 5 illustrates a second example of the DSP included in the transmitter. The DSP 200 is illustrated in FIG. 5. The DSP 200 includes N amplitude control units 212, N arithmetic units 214, N down-sampling units 218, (N−1) dispersion arithmetic units 220, an adder 222, and a distortion compensation arithmetic unit 232. In this example, the N amplitude control units 212 are formed from a 1st amplitude control unit 212-1 to an N-th amplitude control unit 212-N. The N arithmetic units 214 are formed from a 1st arithmetic unit 214-1 to an N-th arithmetic unit 214-N. The N down-sampling units 218 are formed from a 1st down-sampling unit 218-1 to an N-th down-sampling unit 218-N. The (N−1) dispersion arithmetic units 220 are formed from a 1st dispersion arithmetic unit 220-1 to an (N−1)-th dispersion arithmetic unit 220-N−1. In this example, the DSP 200 is considered as a DSP of the transmitter for the k-th channel.

Each of the N amplitude control units 212 corresponds to one of the optical amplifiers disposed in a transmission line. The amplitude control unit 212 simulates the optical amplifier. The amplitude control unit 212 is similar to the amplitude control unit 112 of the DSP 100.

Each of the down-sampling units 218 down-samples the output of one of the amplitude control units 212. Since the frequency transfer function is applied in the arithmetic unit 214 and, thus, a high-frequency component is cut off, degradation of a signal is not significant even when down-sampling is performed in advance.

The arithmetic unit 214 computes the above-described $p_{k,n,x/y}$ and $q_{k,n,x/y}$. The arithmetic unit 214 computes $p_{k,n,x/y}$ and $q_{k,n,x/y}$ on the basis of a signal output from the down-sampling unit 218. In addition, the arithmetic unit 214 computes the above-described $H_{k,n}(\omega)$ (or $h_{k,n}(t)$). In order to compute $H_{k,n}(\omega)$, the group velocity of the span, the attenuation coefficient of the span, the non-linear parameter of the span, and the length of the span are used, for example. These data are prestored in each of the transmitters. The arithmetic unit 214 uses such stored data. In addition, the arithmetic unit 214 multiplies each of $p_{k,n,x/y}$ and $q_{k,n,x/y}$ by the frequency transfer function $H_{k,n}(\omega)$. This multiplication operation may be performed in the frequency space using $H_{k,n}(\omega)$ or in the time space using $h_{k,n}(t)$.

Each of the dispersion arithmetic units 220 corresponds to one of the spans of the optical transmission line. The dispersion arithmetic unit 220 simulates the chromatic dispersion of the span of the optical transmission line. The dispersion arithmetic unit 220 is similar to the dispersion arithmetic unit 120 of the DSP 100.

The adder 222 sums the outputs of the N arithmetic units 214. The adder 222 outputs the sum to the other transmitters as the data waveform information regarding the k-th channel. The data waveform information regarding the k-th channel includes the above-described $w_{k,n,xy/yx}$ and $\phi_{k,n,x/y}$. A buffer circuit may be disposed between the adder 222 and the output of each of the arithmetic units 214.

The distortion compensation arithmetic unit 232 computes the matrix W for the k-th channel on the basis of the data waveform information received from the transmitters for the other channels. The matrix W for the k-th channel indicates the effect of XPM on the signal of the k-th channel in the transmission line. The distortion compensation arithmetic unit 232 multiplies the data $(u_x, u_y)^T$ to be transmitted by the inverse matrix of the matrix W for the k-th channel. The distortion compensation arithmetic unit 232 outputs the result of computation to the DAC.

Since, in the DSP 200, the processing is performed by the dispersion arithmetic units 220 and the amplitude control unit 212 before data are input to the down-sampling units 218, degradation of a signal can be reduced. In addition, since the processing is performed by the arithmetic unit 214 after data are input to the down-sampling units 218, the circuit size of the arithmetic unit 214 can be reduced. In addition, since the signal is down-sampled by the down-sampling unit 218, the data waveform information is transmitted to the other transmitters at a bit rate that is lower than that of the transmission signal.

A buffer circuit that adjusts a delay of processing may be provided on the input side of the distortion compensation arithmetic unit 232. In addition, a signal processing circuit and a filter may be provided on the input side or the output side of the distortion compensation arithmetic unit 232.

The amplitude control unit 212, the arithmetic unit 214, the down-sampling units 218, the dispersion arithmetic units 220, and the adder 222 together serve as a first computing unit. In contrast, the distortion compensation arithmetic unit 232 serves as a second computing unit.

Figure 6:
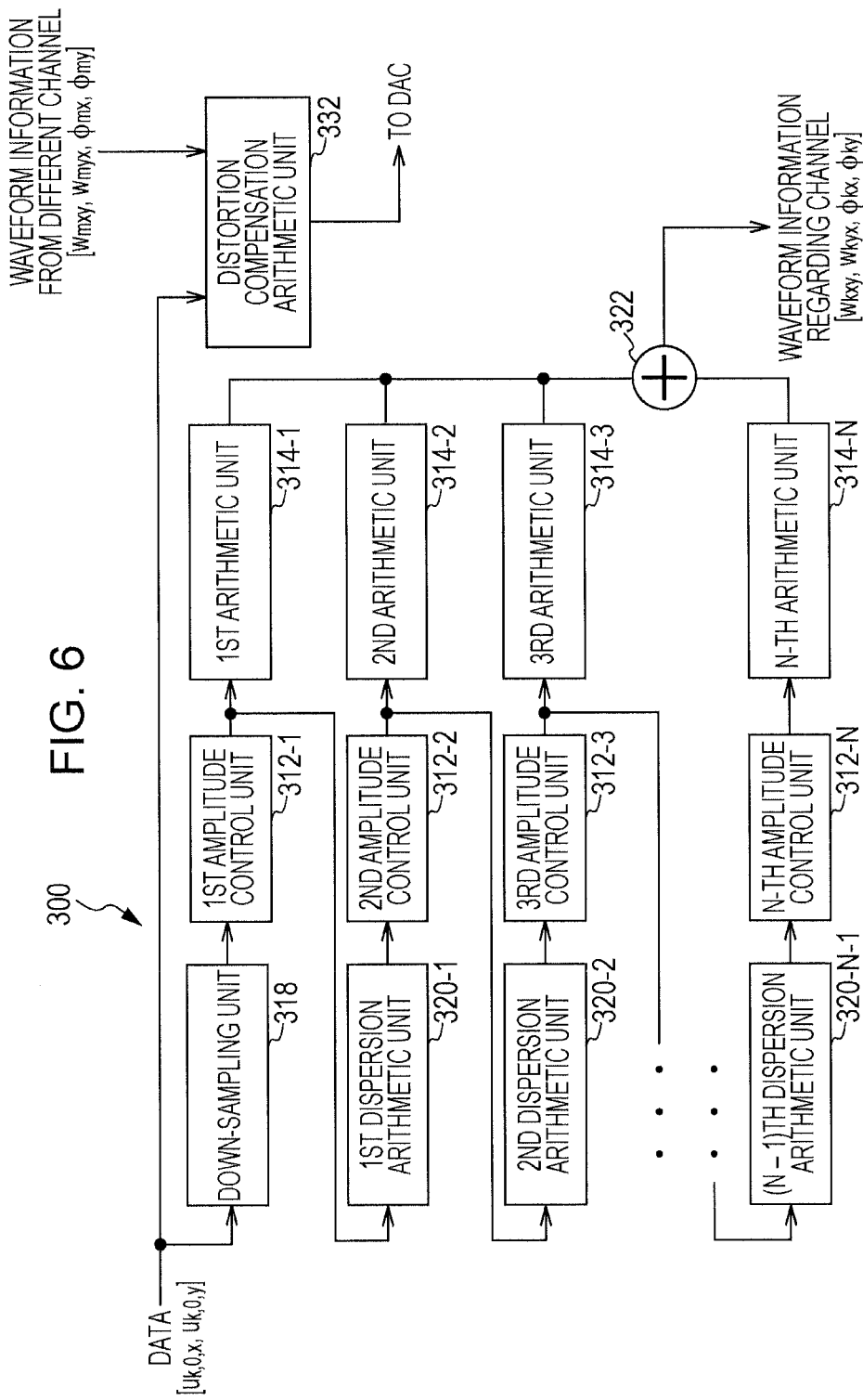
FIG. 6 illustrates a third functional configuration for executing a program using a DSP included in the transmitter.

FIG. 6 illustrates a third example of the DSP included in the transmitter. The DSP 300 is illustrated in FIG. 6. The DSP 300 includes N amplitude control units 312, N arithmetic units 314, a down-sampling unit 318, (N−1) dispersion arithmetic units 320, an adder 322, and a distortion compensation arithmetic unit 332. In this example, the N amplitude control units 312 are formed from a 1st amplitude control units 312-1 to an N-th amplitude control units 312-N. The N arithmetic units 314 are formed from a 1st arithmetic unit 314-1 to an N-th arithmetic unit 314-N. The (N−1) dispersion arithmetic units 320 are formed from a 1st dispersion arithmetic unit 320-1 to an (N−1)-th dispersion arithmetic unit 320-N−1. In this example, the DSP 300 is considered as a DSP of the transmitter for the k-th channel.

Each of the down-sampling units 318 down-samples data to be transmitted. Since down-sampling is performed first, the circuit size of each of the control units 312, the arithmetic units 314, and the dispersion arithmetic units 320 can be reduced.

Each of the amplitude control units 312 corresponds to one of the optical amplifiers disposed in an optical transmission line. The amplitude control unit 312 simulates the optical amplifier. The amplitude control unit 312 is similar to the amplitude control unit 112 of the DSP 100.

The arithmetic unit 314 computes the above-described $p_{k, n, x/y}$ and $q_{k, n, x/y}$. The arithmetic unit 314 computes $p_{k, n, x/y}$ and $q_{k, n, x/y}$ on the basis of a signal output from the amplitude control unit 312. In addition, the arithmetic unit 314 computes the above-described $H_{k, n}(\omega)$ (or $h_{k, n}(t)$). In order to compute $H_{k, n}(\omega)$, the group velocity of the span, the attenuation coefficient of the span, the non-linear parameter of the span, and the length of the span are used, for example. These data are prestored in each of the transmitters. The arithmetic unit 314 uses such stored data. In addition, the arithmetic unit 314 multiplies each of $p_{k, n, x/y}$ and $q_{k, n, x/y}$ by the frequency transfer function $H_{k, n}(\omega)$. This multiplication operation may be performed in the frequency space using $H_{k, n}(\omega)$ or in the time space using $h_{k, n}(t)$. A buffer circuit that adjusts a delay of processing may be provided between the adder 322 and the output of each of the arithmetic units 314.

Each of the dispersion arithmetic units 320 corresponds to one of the spans of the optical transmission line. The dispersion arithmetic unit 320 simulates the chromatic dispersion of the span of the optical transmission line. The dispersion arithmetic unit 320 is similar to the dispersion arithmetic unit 120 of the DSP 100.

The distortion compensation arithmetic unit 332 computes the matrix W for the k-th channel on the basis of the data waveform information received from the transmitters for the other channels. The matrix W for the k-th channel indicates the effect of XPM on the signal of the k-th channel in the transmission line. The distortion compensation arithmetic unit 332 multiplies the data $(u_x, u_y)^T$ to be transmitted by the inverse matrix of the matrix W for the k-th channel. The distortion compensation arithmetic unit 332 outputs the result of computation to the DAC.

Since, in the DSP 300, the processing is performed by the dispersion arithmetic units 320, the amplitude control unit 312, and the arithmetic unit 314 after data are input to the down-sampling units 318, the circuit size of the DSP 300 can be reduced. In addition, in the DSP 300, the computation load in the processing performed by the dispersion arithmetic units 320 and the amplitude control units 312 can be reduced to less than that of the DSP 100 or the DSP 200.

Since the signal is down-sampled by the down-sampling unit 318, the data waveform information is transmitted to the other transmitters at a bit rate that is lower than that of the transmission signal.

A buffer circuit that adjusts a delay of computation may be provided on the input side of the distortion compensation arithmetic unit 332. In addition, a signal processing circuit and a filter that compensates for factors other than XPM may be provided on the input side or the output side of the distortion compensation arithmetic unit 332.

The amplitude control unit 312, the arithmetic unit 314, the dispersion arithmetic units 320, and the adder 322 together serve as a first computing unit. In contrast, the distortion compensation arithmetic unit 332 serves as a second computing unit.

The first example of the DSP, the second example of the DSP, and the third example of the DSP may be combined in any way possible.

In this case, an optical transmission line including a first span to an N-th span is present between an apparatus on the transmitter side and an apparatus on the receiver side. At that time, if an optical transmission line including the first span to a P-th span (P>N) is present, degradation of a signal may be computed using information regarding the optical transmission line including the first span to the N-th span in the above-described manner.

In addition, in this case, the apparatus on the transmitter side includes a first channel to an M-th channel. At that time, if the first channel to a Q-th channel (Q>M) are present, degradation of the signal may be computed using information regarding the first channel to the M-th channel in the above-described manner.

According to the present exemplary embodiment, a transmitter 1000 computes the data waveform information on the basis of, for example, information regarding the transmission line and data to be transmitted. When computing the data waveform information, the transmitter 1000 performs down-sampling. Thereafter, the transmitter 1000 transmits the computed data waveform information to the other transmitters. By performing down-sampling, the transmitter 1000 can transmit the data waveform information at a bit rate that is lower than that of the transmission signal. Since the data waveform information used for XPM compensation is included in a low-frequency component of the signal, down-sampling has little impact on the quality of the signal.

The transmitter 1000 computes the matrix W indicating the waveform distortion caused by XPM on the basis of, for example, the data waveform information transmitted from the other transmitters (transmitters for the other channels). By applying the inverse matrix of the matrix W to the transmission signal, the transmitter 1000 can pre-equalize or reduce XPM.

The transmitter 1000 takes into account the effect of a plurality of spans of the optical transmission line and computes the matrix W that indicates the distortion of the waveform caused by XPM. By using the matrix W, the transmitter 1000 can pre-equalize or reduce XPM while taking into account the polarization crosstalk of a polarization multiplexing signal.

According to the present disclosure, an optical transmitter that pre-equalizes or reduces XPM can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission apparatus for transmitting a wavelength division multiplexing optical signal having polarization multiplexing optical signals, the optical transmission apparatus comprising:

optical transmitters configured to correspond to the polarization multiplexing optical signals, each of at least two of the optical transmitters including a first computing unit configured to compute, based on information regarding an optical transmission line including a plurality of spans and a polarization multiplexing optical signal, data waveform information regarding the optical transmitter and to transmit non-multiplexed data waveform information to at least one other optical transmitter provided for at least one other polarization multiplexing optical signal, and a second computing unit configured to receive the non-multiplexed data waveform information from the at least one other optical transmitter provided for the at least one other polarization multiplexing optical signal and to pre-equalize or reduce cross phase modulation occurring in the optical transmission line of a transmission signal based on the non-multiplexed data waveform information received from the at least one another optical transmitter provided for the at least one other polarization multiplexing optical signal.

2. The optical transmission apparatus according to claim 1, wherein a communication bit rate used when the first computing unit transmits the data waveform information regarding the optical transmitter to the at least one another optical transmitter for the at least one another polarization multiplexing optical signal is lower than the communication bit rate used when the transmission signal is transmitted.

3. An optical transmission apparatus for transmitting a wavelength division multiplexing optical signal having wavelength signals, the optical transmission apparatus comprising:

optical transmitters configured to correspond to the wavelength signals, each of at least two of the optical transmitters including a first computing unit configured to compute, based on information regarding an optical transmission line including a plurality of spans and a transmission signal that is a wavelength division multiplexing optical signal, data waveform information regarding the optical transmitter and to transmit non-multiplexed data waveform information to at least one other optical transmitter provided for the at least one other wavelength signal, and a second computing unit configured to receive the non-multiplexed data waveform information from the at least one other optical transmitter provided for the at least one other wavelength signal and to pre-equalize or reduce cross phase modulation occurring in the optical transmission line of the transmission signal based on the non-multiplexed data waveform information received from the optical transmitter provided for the at least one other wavelength signal.

4. The optical transmission apparatus according to claim 3, wherein at least one of wavelengths of the wavelength multiplexing optical signal transmitted from the optical transmitter is used as a polarization multiplexing signal.

5. The optical transmission apparatus according to claim 4, wherein a communication bit rate used when the first computing unit transmits the data waveform information regarding the optical transmitter to the at least one another optical transmitter for the at least one another polarization multiplexing optical signal is lower than the communication bit rate used when the transmission signal is transmitted.

* * * * *

UNITED STATES PATENT AND TRADEMARK OFFICE
CERTIFICATE OF CORRECTION

| | | |
|---|---|---|
| PATENT NO. | : 9,094,121 B2 | Page 1 of 1 |
| APPLICATION NO. | : 13/790620 | |
| DATED | : July 28, 2015 | |
| INVENTOR(S) | : Tomofumi Oyama et al. | |

It is certified that error appears in the above-identified patent and that said Letters Patent is hereby corrected as shown below:

ON THE TITLE PAGE

Item (73) Assignee, Line 1

Delete "FUJISTU" and insert --FUJITSU--, therefor.

Signed and Sealed this
Sixteenth Day of February, 2016

Michelle K. Lee
*Director of the United States Patent and Trademark Office*